United States Patent [19]

Ohata et al.

[11] Patent Number: 5,426,988

[45] Date of Patent: Jun. 27, 1995

[54] DEVICE FOR RECIPROCATING A PLUNGER OR THE LIKE

[75] Inventors: Toshihisa Ohata, Tokyo; Takayuki Yatabe, Kanagawa, both of Japan

[73] Assignee: NSK Ltd., Tokyo, Japan

[21] Appl. No.: 4,258

[22] Filed: Jan. 14, 1993

[30] Foreign Application Priority Data

Jan. 16, 1992 [JP] Japan .............................. 4-004978 U

[51] Int. Cl.$^6$ ....................... F16C 33/00; F16H 25/14
[52] U.S. Cl. .................................. 74/55; 74/569; 74/570; 384/255; 384/488; 384/492; 384/498; 384/527; 384/625
[58] Field of Search ............................ 74/55, 569, 570; 417/415; 384/488, 255, 484, 488, 492, 498, 527, 625

[56] References Cited

U.S. PATENT DOCUMENTS

| | | | |
|---|---|---|---|
| 1,998,083 | 4/1935 | Grob et al. | 74/55 |
| 2,884,842 | 5/1959 | Schmitz | 74/55 |
| 4,124,257 | 11/1978 | Derner et al. | 384/498 |
| 4,621,566 | 11/1986 | Johnson et al. | 417/454 X |
| 4,930,909 | 6/1990 | Murakami et al. | 384/492 |
| 4,973,172 | 11/1990 | Nisley et al. | 384/498 X |
| 4,997,295 | 3/1991 | Saitou | 384/527 X |
| 5,084,116 | 1/1992 | Mitamura | 384/492 X |
| 5,171,514 | 12/1992 | Veronesi et al. | 376/204 |

FOREIGN PATENT DOCUMENTS

| | | |
|---|---|---|
| 39-18611 | 7/1964 | Japan . |
| 2-146220 | 12/1990 | Japan . |
| 3-78130 | 8/1991 | Japan . |
| 215084 | 5/1924 | United Kingdom . |
| 567544 | 2/1945 | United Kingdom . |
| 594615 | 11/1947 | United Kingdom . |

*Primary Examiner*—Allan D. Herrmann
*Attorney, Agent, or Firm*—Sughrue, Mion, Zinn, Macpeak & Seas

[57] ABSTRACT

A device for reciprocating a plunger according to the present invention comprises: an electric motor; a drive shaft rotated by the electric motor; an inner race fixedly mounted on the drive shaft, the inner race having an inner race track which is formed on the outer cylindrical surface of the inner race in such a manner that the inner trace track is not coaxial with the inner cylindrical surface of the inner race and the drive shaft; an outer race provided around the inner race, the outer race having an outer race track which is coaxial with the inner race track; a plurality of rolling members provided between the outer race track and the inner race track; and a plunger member movably supported in an axial direction thereof, one end of the plunger member being elastically abutted against the outer cylindrical surface of the outer race. According to the present invention, it is possible to make a manufacturing cost lower, to make the whole of the device smaller in weight, and to make a quality higher.

13 Claims, 5 Drawing Sheets

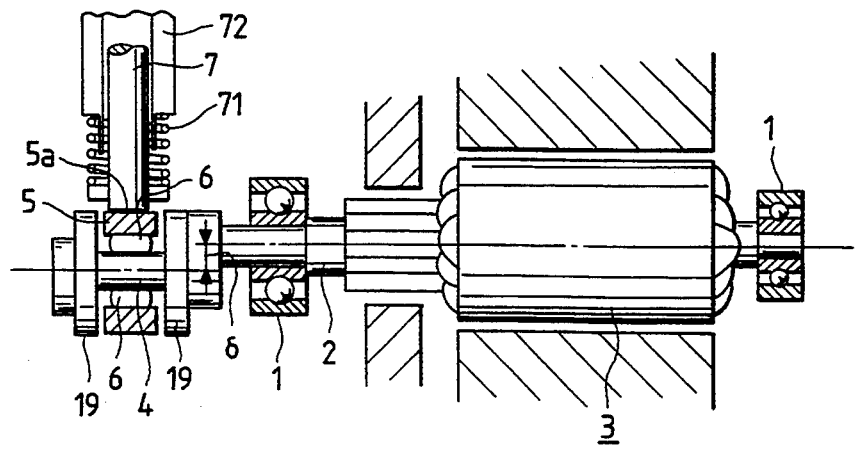
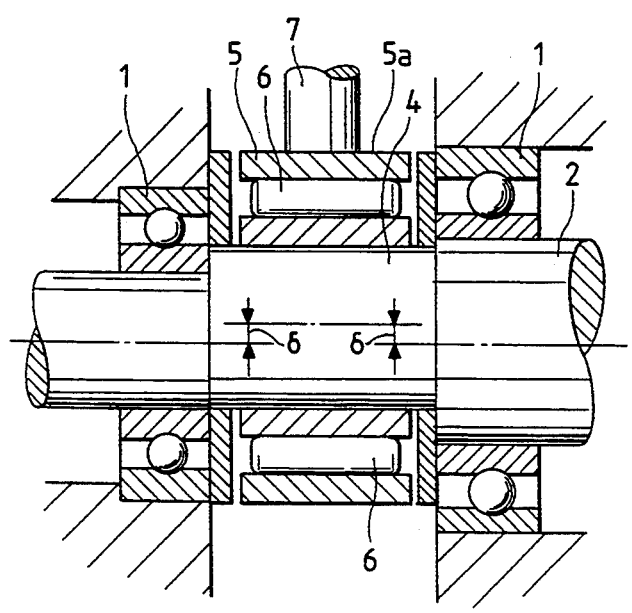
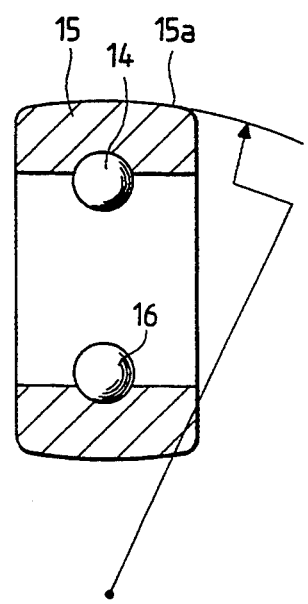

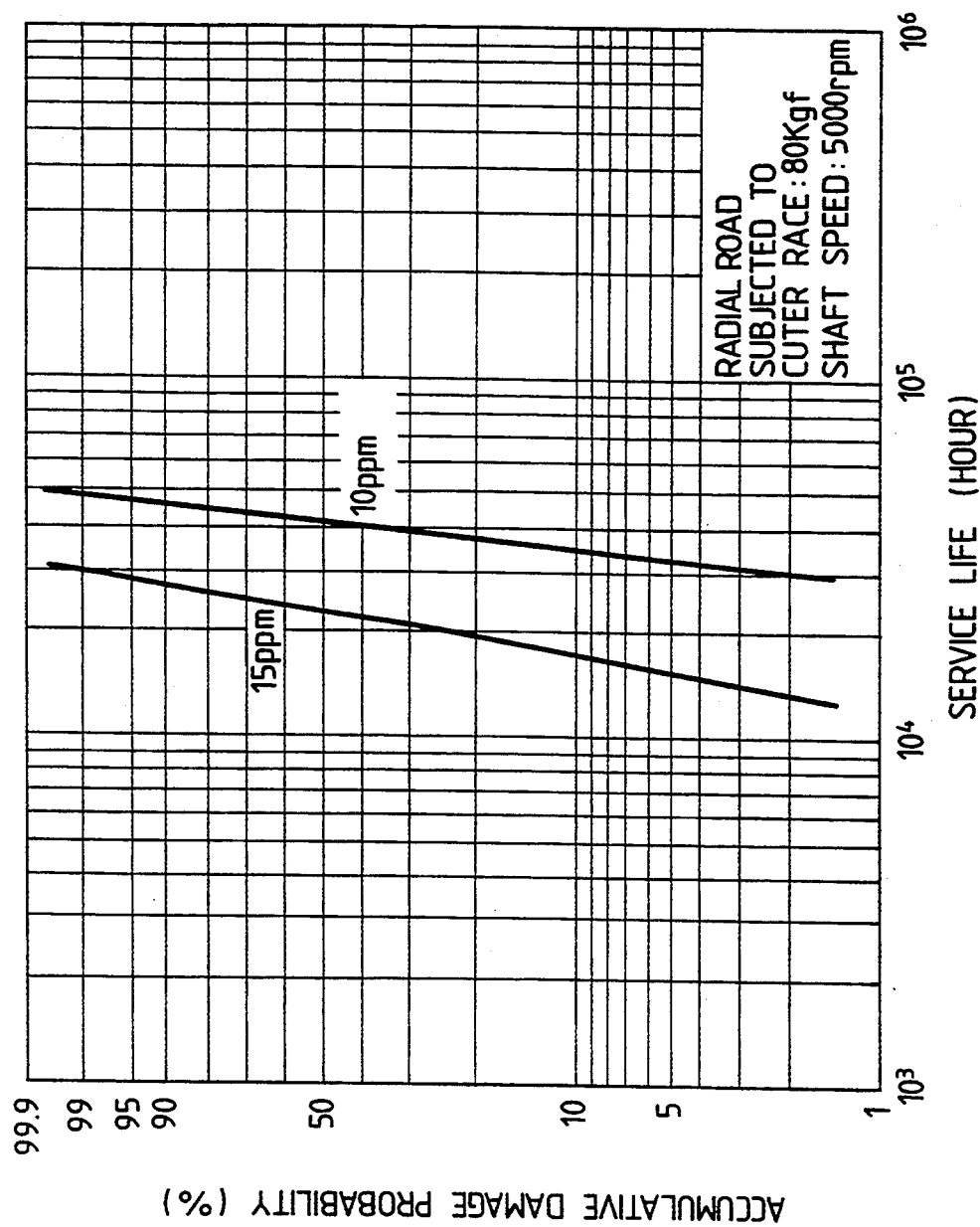

DEVICE FOR RECIPROCATING A PLUNGER OR THE LIKE

BACKGROUND OF THE INVENTION

This invention relates to a device for reciprocating a plunger or the like which converts rotation of an electric motor into reciprocation of a plunger or a piston (hereinafter any member which is reciprocated by the device will be referred to as "a plunger or the like" when applicable). The device is, for instance, built in an anti-lock brake system (ABS) in a large motor vehicle.

When the anti-lock brake system in a motor vehicle is in operation, a so-called "pumping brake" is automatically applied so that a wheel locking state and a wheel unlocking state are sensitively switched over to each other. Therefore, in this case, it is necessary to sensitively switch the relevant hydraulic pipe lines. In the case of an anti-lock brake system for large motor vehicles such as trucks and trailers, a mechanism as shown in FIGS. 3 and 4 is employed for switching the hydraulic pipe lines.

A drive shaft 2, which are supported by bearings 1 and 1 at both ends, is rotated by an electric motor 3 set between the bearings 1 and 1. A crank 4 is provided at one end (the left end in FIG. 3) of the drive shaft in such a manner that it is off-centered from the drive shaft 2 as much as δ. An outer race 5 is supported through needle 6 on the crank 4 in such manner that the crank 4 is rotatable relative to the outer race 5. In the case of FIG. 3, the crank 4 is cantilevered from the end portion of the drive shaft 2. However, it may be replaced with a center crank provided at the middle of the drive shaft 2 as shown in FIG. 4.

One end of a plunger 7 is held elastically abutted against the outer cylindrical surface of the outer race 5 through a spring means 71. More specifically, the plunger 7 is supported by a guide 72 in such a manner that it is allowed to displace only axially (vertically in FIG. 3 or 4), and it is elastically abutted against the outer cylindrical surface 5a of the outer race 5. The friction between the outer race 5 and one end of the plunger 7 prevents the outer race 5 from rotating relative to the plunger 7.

The mechanism is designed as described above. Hence, when the electric motor is switched on, the drive shaft 2 is rotated, so that the outer race 5 is whirled with an eccentricity of 6. This whirling motion causes the plunger 7 to reciprocate axially. As a result, the other end portion of the plunger 7 operates a control valve built in the anti-lock brake system (ABS); that is, a pumping braking operation is carried out.

The conventional device for reciprocating a plunger or the like which is built in an anti-lock brake system is designed and operated as described above. However, it should be noted that it is rather difficult to form the crank 4 which is off-centered from the drive shaft 2, which increases the manufacturing cost of the device as much. In addition, the device is disadvantageous in the following points: The plunger may give an impact load or unbalanced load to the outer race 5, thus cracking the latter 5, Furthermore, oil may leak through the plunger, as a result of which the grease provided inside a space between the outer race 5 and an inner race may flow out of it. These difficulties, in addition to the manufacturing cost, make it not practical to build the device in the anti-lock brake system of a small motor vehicle which is relatively low in manufacturing cost. In addition, the device is low in durability, and accordingly in reliability.

In reciprocating the piston of a hydraulic pump with the device, the performance of the pump may be improved by increasing the eccentricity δ of the crank 4 with respect to the drive shaft 2. However, the method is not practical as follows: In the case where the eccentricity δ of the crank in the above-described device is increased, it is essential to maintain the rigidity of the drive shaft. For this purpose, it is necessary to increase, for instance, the outside diameter of the latter 2. This means that the device is increased in weight as much.

SUMMARY OF THE INVENTION

Accordingly, it is an object of this invention to eliminate the above-described difficulties accompanying a conventional device for reciprocating a plunger or the like.

A device for reciprocating a plunger or the like, according to the invention, comprises: an electric motor; a drive shaft rotated by the electric motor; an inner race fixedly mounted on the drive shaft; an inner race track formed on the outer cylindrical surface of the inner race in such a manner that the inner race track is eccentric from the inner cylindrical surface of the inner race and the drive shaft; an outer race provided around the inner race; an outer race track coaxial with the inner race track; a plurality of rolling members provided between the outer race track and the inner race track; and a plunger or the like which is so supported as to be movable axially, one end of the plunger or the like being elastically abutting against the outer cylindrical surface of the outer race.

The device for reciprocating a plunger or the like according to the invention operates as follows: When the drive shaft is rotated by the electric motor, the inner race fixedly mounted on the drive shaft is rotated, and the inner race track off-centered from the drive shaft is turned around the drive shaft. Therefore, the outer race rotatably supported through the rolling members on the inner race track is whirled around the drive shaft, so that the plunger or the like is reciprocated with its one end abutted against the outer cylindrical surface of the outer race.

The device of the invention is so designed that the inner race track is off-centered from the inner cylindrical surface of the inner race so that the plunger or the like is reciprocated. Hence, the components can be manufactured readily, and the device of the invention is lower in manufacturing cost than the conventional device. Furthermore, even in the case where, in order to increase the amount of reciprocation of the plunger or the like, the eccentricity of the inner race track with respect to the inner cylindrical surface of the inner race is increased, the rigidity can be maintained without increasing the weight.

In installation of the device, the outer race may be inclined; that is, unbalanced load may be applied to it. In this case, the outer race may be cracked. In order to overcome this difficulty, the following method may be employed. The outer race, the inner race, and the rolling members may be carburized or carbonitrided so that only the surfaces thereof are hardened, or they are made of a high-clean steel which is less in the density of impurities in steel. The outer race, the inner race, and the rolling members thus processed are substantially prevented from being internally cracked.

As the above-described high-clean steel, a high carbon through hardening steel (for example, a high carbon Cr steel) with the oxygen content being adjusted to no more than 9 ppm or a carburizing clean steel with the oxygen content being adjusted to no more than 10 ppm may be utilized. In the high carbon through hardening steel (for example, the high carbon Cr steel), the oxygen content is preferably adjusted to no more than 7 ppm, and further is more preferably adjusted to no more than 6 ppm in such a manner that the cleanness of the steel can be increased. In the carburizing clean steel, the oxygen content is preferably adjusted to no more than 9 ppm, and further is more preferably adjusted to no more than 7 ppm in such a manner that the cleanness of the steel can be increased.

However, in both the high carbon through hardening steel (for example, the high carbon Cr steel) and the carburizing clean steel, it is generally difficult to increase the cleanness of the steel with the oxygen content being adjusted less than 4 ppm, and it is impossible to have the highest cleanness of the steel with the oxygen content being adjusted to 0 ppm, in view of the present manufacturing technique. In addition, in both the high carbon through hardening steel (for example, the high carbon Cr steel) and the carburizing clean steel, when the oxygen content is larger than 10 ppm, a service life and the shock resistance become lowered. Accordingly, the bearing of the present invention may be made of a high carbon through hardening steel (for example, a high carbon Cr steel) with the oxygen content being adjusted in the range of 0–9 ppm, preferably 4–6 ppm, or a carburizing clean steel with the oxygen content being adjusted in the range of 0–10 ppm, preferably 4–7 ppm.

The holder supporting the rolling members may be made of a synthetic resin. This is advantageous in that, when the outer race is inclined, it is aligned by the bearing itself. This prevents the bearing from seizure, and increases the service life of the grease in it, and improves the high speed durability.

On the other hand, oil may leak through the plunger or the like into the bearing, wetting the inner cylindrical surface of the outer race, thus causing the grease to flow out. In order to eliminate this difficulty, the bearing may be provided with a sealing structure which is made of a material resistive against brake oil. This will increase the service life of the device.

BRIEF DESCRIPTION OF THE DRAWINGS

FIG. 2A is a sectional view of the bearing, and FIG. 2B is a side view of the latter.

FIG. 3 is a sectional view showing one example of a conventional device for reciprocating a plunger or the like.

FIG. 4 is a sectional view showing another example of the conventional device.

FIG. 5 is a sectional view showing one modification of an outer race of the device according to the present invention.

FIG. 6 is a graphical representation how the service life of a bearing depends on the density of oxygen in a steel forming it.

DETAILED DESCRIPTION OF THE PREFERRED EMBODIMENTS

Figure 1:
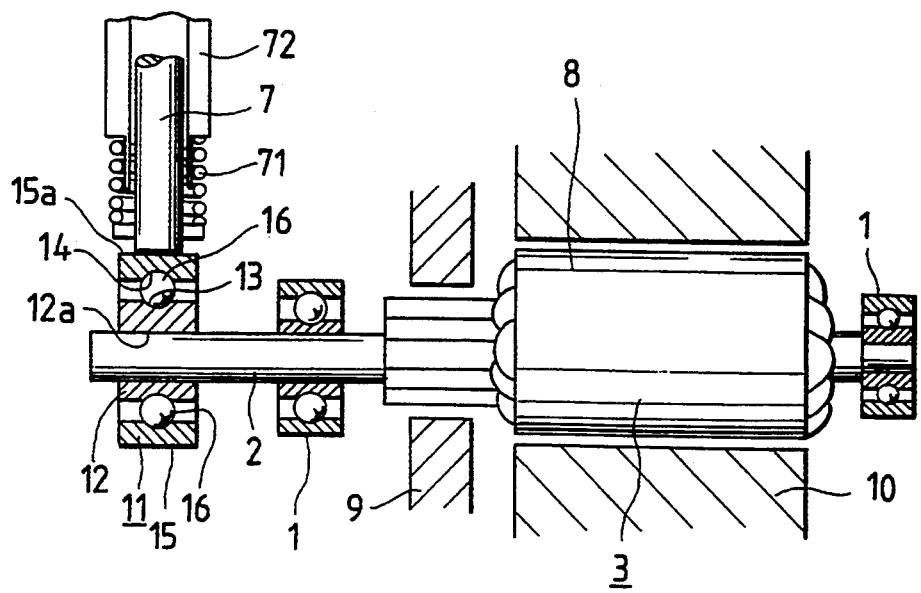
FIG. 1 is a sectional view showing one embodiment of this invention.
Figure 2A:
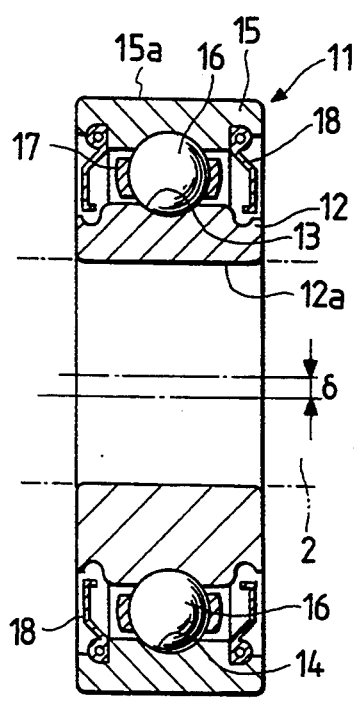
FIGS. 2A and 2B show a ball-and-roller bearing. More specifically.
Figure 2B:
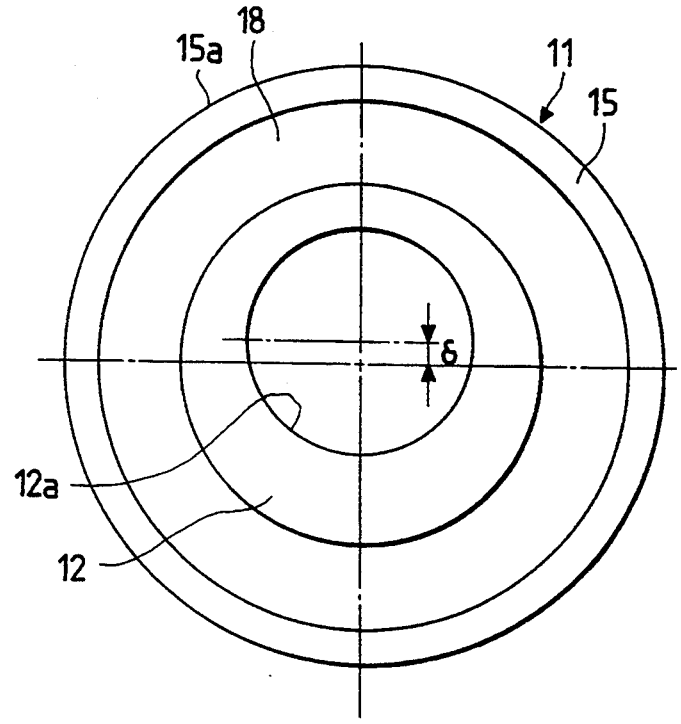

FIGS. 1, 2A and 2B show one embodiment of this invention. As shown in those figures, an electric motor 3 comprises: a rotor 8, brushes 9 for applying current to the rotor 8; and a stator 10 provided around the rotor 8. Upon application of current through the brushes 9 to the rotor 8, the latter 8 is rotated; that is, a drive shaft 2 connected to the rotor 8 is rotated.

The drive shaft 2 is supported by rolling bearings 1 and 1 at two points; i.e., at one end (at the right end in FIG. 1) and at the middle. An inner race 12, which forms a ball-and-roller bearing as shown in FIGS. 2A and 2B, is fixedly mounted on the other end portion of the drive shaft 2.

An inner race track 13 is formed on the outer cylindrical surface of the inner race 12 in such a manner that it is off-centered as much as $\delta$ from the inner cylindrical surface 12a of the inner race 12 and the drive shaft. An outer race 15 having an outer race track 14 in its inner cylindrical surface is provided around the inner race 12. The outer cylindrical surface 15a of the outer race 15, the outer race track 14, and the inner race track 13 are coaxial with one another. Rolling members, namely, balls 16 are rotatably fitted between the outer race rack 14 and the inner race track 13, so that the inner race 12 and the outer race 15 are freely rotatable relative to each other.

The bearing according to the present invention may be made from a steel containing components of carburizing steel or through hardening steel which is utilized as a bearing steel.

As one example, the inner race, the outer race, and the rolling members may be formed by using a high cleanliness carburizing steel SCR 420 (manufactured by Sanyoh Tokushu Koh Co. Ltd.). The carburizing steel, for example, contains the following components:

C: 0.21 wt %, Si: 0.24 wt %, Mn: 0.79 wt %,
P: 0.018 wt %, S: 0.011 wt %, Ni: 0.07 wt %,
Cr: 1.09 wt %, Mo: 0.03 wt %, Cu: 0.09 wt %,
0: 7 ppm, Ti: 20 ppm; Al: 0.025 wt % The inner race, the outer race, and the rolling member thus formed are carburized or carbonitrided and hardened by heat treatment. The resultant bearing is high in shock resistance, and is prevented from being internally cracked, and is lengthened in service life.

As the other example, the bearing may also be made by using a bearing steel which is a high carbon through hardening steel (for example, a high carbon Cr steel), for instance, a clean steel containing C: 0.99 wt %, Cr: 1.46 wt % and 0: 6 ppm (manufactured by Sanyoh Tokushu Koh Co. Ltd.). The steel may be subjected to a through hardening as it is. In this case, since it is a low oxygen steel in which its oxygen content is low, similarly as in the above-described bearing made of the carburizing steel, the bearing is high in shock resistance, and increased in service life.

FIG. 6 is a graphical representation for a description of how the service life of the bearing depends on the density of oxygen in steel. As is seen from FIG. 6, in the case where the bearing formed of a carburizing steel subjected to carburizing is applied to the device of the invention, the bearing made of a material which is lower in the oxygen content (according to the invention) is longer in service life.

Figure 7:
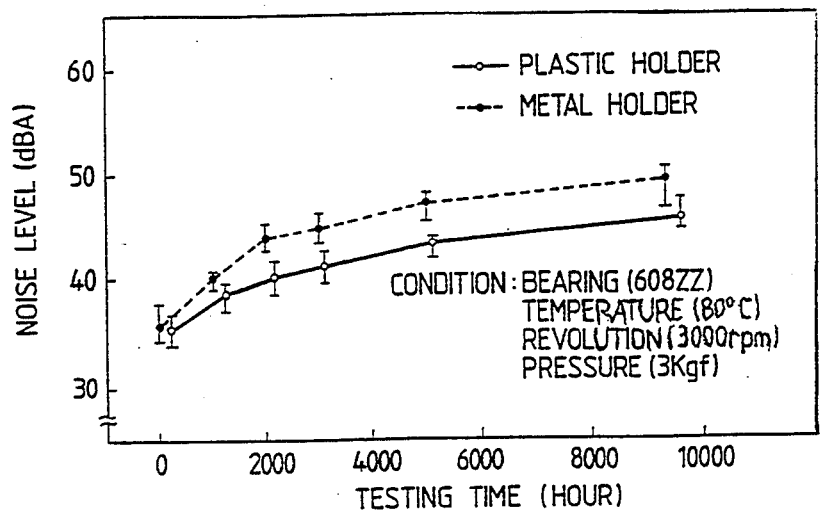
FIG. 7 is a graphical representation indicating how the seizure resistance of a holder depends on its material.
Figure 8:
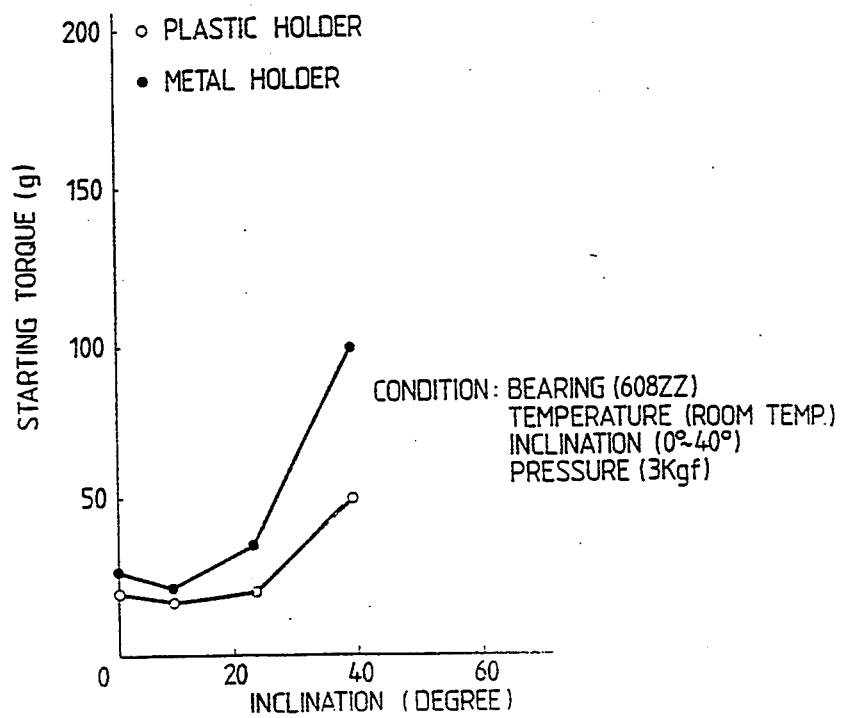
FIG. 8 is a graphical representation for a description of the effect of a plastic holder which is revealed when the bearing is inclined.

In FIG. 2A, reference 17 designates a holder which rotatably holds the balls 16. The holder 17 may be made of a thermo-setting or thermo-plastic material such as polyamide resin, polyphenylene sulfide, fluoro-resin, phenol resin, and polyacetal. The plastic holder 17 thus formed is advantageous in the following points: When the bearings 1 and 1 are inclined by an unbalanced load applied thereto, the plastic holder 17 allows the bearing to act in a self-aligning mode. This characteristic prevents the bearing from seizure, and increases the service life of the grease in it, and improves the durability in high speed operation. FIGS. 7 and 8 shows the results of comparison between use of the plastic holder and that of a metal holder (made of a steel plate for instance) in the bearing. That is, in the case where the plastic holder is applied to the bearing in the device of the invention, the noise influence (wear) is low, and even if the shaft suffers from misalignment, the start torque is smaller than in the case where the metal holder is employed.

Figure 9C:
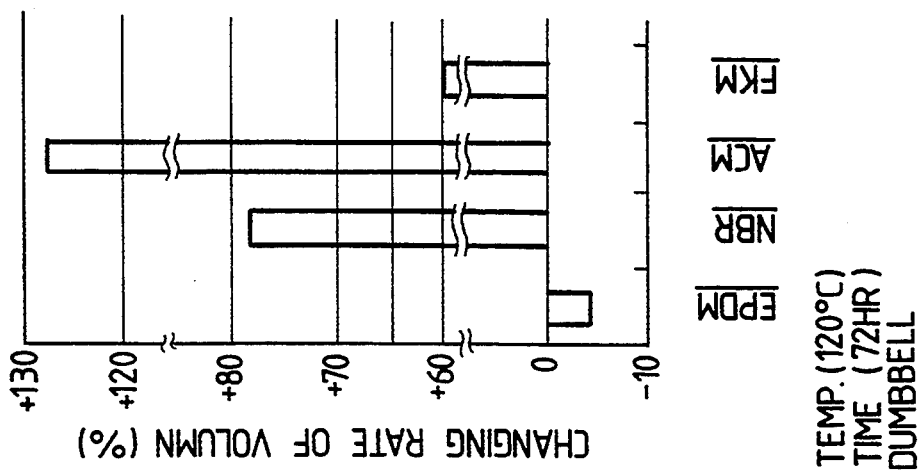
FIGS. 9(A)–9(C) are a graphical representation indicating how an EPDM material is resistive against brake oil.
Figure 9B:
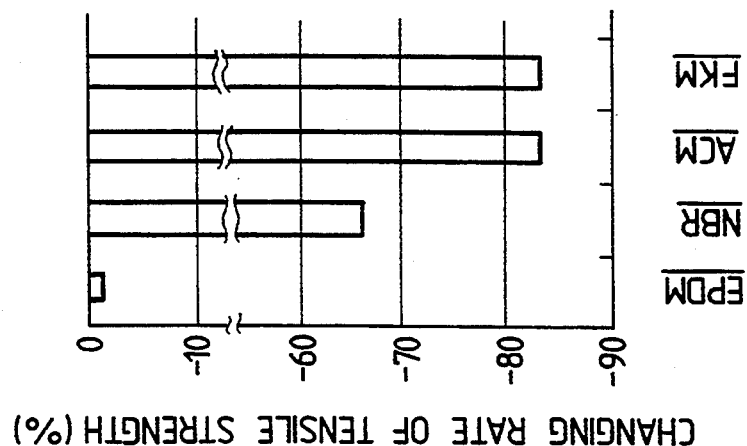
Figure 9A:
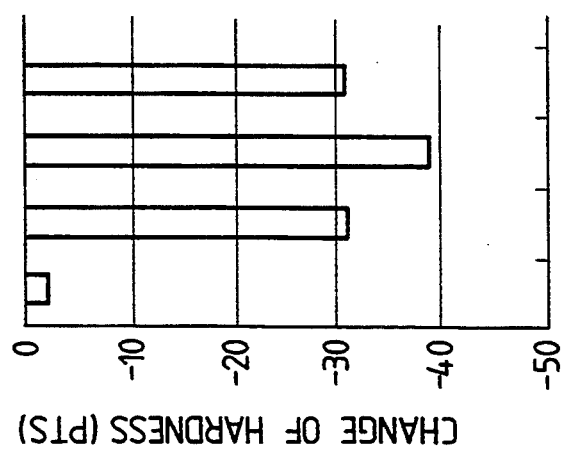

Further in FIGS 2A and 2B, reference numeral 18 designates seal rings which prevents not only the leakage of grease from around the balls 16 but also the entrance of dust or the like thereinto. Under the condition that the brake oil of the anti-lock brake system may splash onto the seal rings, it is not desirable to use seal rings which are made of nitrile rubber, because the oil may swell the nitrile rubber seal rings. Hence, in the device of the invention, the seal rings are made of a metal or EPDM (ethylene-propylene-diene monomer) rubber which is resistive against oil. FIGS. 9(A)-9(C) show the resistance of the EPDM material against brake oil. As is apparent from FIGS. 9(A)-9(C), the EPDM is much higher in resistance against brake oil than NBR (polybutadiene rubber) and ACM (acrylic rubber).

One end face of a plunger 7 is abutted against the outer cylindrical surface 15a of the outer race 15. More specifically, the plunger 7 is supported by a guide 72 in such a manner that it is allowed to displace only in an axial direction (vertically in FIG. 1), and it is elastically pushed by a spring means 71 against the outer cylindrical surface 15a of the outer race 15. The friction between the outer race 15 and the plunger 7 is such that the outer race 15 is not rotated thereby.

With the device thus constructed, the plunger is reciprocated as follows: First, current is applied through the brushes 9 to the rotor 8, to rotate the latter 8 and accordingly the drive shaft 2. As the drive shaft 2 is rotated in this way, the inner race 12 fixedly mounted on the drive shaft 2 is rotated while the inner race track 13 off-centered from the drive shaft 2 is turned around the latter 2. As a result, the outer race 15 rotatably supported through the balls 16 on the inner race track 13 is caused to whirl around the drive shaft 2, and therefore the plunger 7 with its one end abutted against the outer cylindrical surface 15 is reciprocated in its axial direction.

If summarized, the device of the invention is so designed that the inner race track 13 is off-centered from the inner cylindrical surface 12a of the inner race 12 thereby to reciprocate the plunger 7. Hence, the components of the device can be manufactured readily, and the device itself is lower in manufacturing cost than the conventional device. Furthermore, even in the case where, in order to increase the amount of reciprocation of the plunger 7 (or a piston), the eccentricity δ of the inner race track 13 with respect to the inner cylindrical surface 12a of the inner race 12 is increased, it is unnecessary to increase the outside diameter and the thickness of the inner race 12. Accordingly, the device is free from the difficulty that the weight must be increased to maintain the rigidity high.

The ball-and-roller bearing 11 for converting rotational motion into reciprocating motion may be replaced by a ball bearing which is designed as follows: The ball bearing has a positive effective gap when installed, and the positive effective gap is set to 2 to 10 μm. The ball bearing thus designed is free from vibration and from seizure, and shows a self-aligning characteristic, thus keeping one end of the plunger 7 abutted satisfactorily against the outer cylindrical surface 15a of the outer race 15. The self-aligning characteristic may be obtained by making the outer cylindrical surface 15a spherical similarly as in the case of the conventional device. By employing the ball bearing instead of the ball-and-roller bearing, the outer race 15 can be prevented from being shifted axially. This dispenses with metal bearings 19 and 19 (FIGS. 3 and 4) which are provided for the conventional device to prevent the outer race from being shifted.

In addition, as shown in FIG. 5, the outer cylindrical surface 15a of the outer race 15 may be spherical so that the one end of the plunger 7 and the outer cylindrical surface 15a are held in contact with each other in a self-aligning mode.

The device for reciprocating a plunger or the like according to the invention, designed as described above, is excellent in performance, and is free from the difficulty that the inner and outer races are cracked. Furthermore, the device is small in size and light in weight, and can be formed at relatively low manufacturing cost.

The foregoing description of preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A device for reciprocating a member which comprises:
   an electric motor;
   a drive shaft rotated by said electric motor;
   an inner race fixedly mounted on said drive shaft, said inner race having an inner race track which is formed on an outer cylindrical surface of said inner race in such a manner that said inner race track is not coaxial with an inner cylindrical surface of said inner race and said drive shaft;
   an outer race provided around said inner race, said outer race having an outer race track which is coaxial with said inner race track;

a plurality of rolling members provided between said outer race track and said inner race track; and a member movably supported in an axial direction thereof, one end of said member being elastically abutted against an outer cylindrical surface of said outer race.

2. A device according to claim 1, in which said plurality of rolling members comprises balls, a gap is defined as the difference between the length of a space formed between said inner race track and said outer track and a diameter of each said balls, said gap is within the range of 2–10 μm.

3. A device according to claim 1, in which the outer cylindrical surface of said outer race is spherical.

4. A device according to claim 1, in which
said inner race, outer race, and rolling members are hardened by heat treatment, and are made of a clean steel with the oxygen content being adjusted to no more than 9 ppm.

5. A device according to claim 4, in which
said inner race, outer race, and rolling members are hardened by heat treatment, and are made of a clean steel with the oxygen content being adjusted to in the range of 4–6 ppm.

6. A device according to claim 1, in which
said inner race, outer race and rolling members are carburized or carbonitrided, and hardened by heat treatment, and are made of a carburizing clean steel with the oxygen content being adjusted to no more than 10 ppm.

7. A device according to claim 1, in which
said inner race, outer race and rolling members are carburized or carbonitrided, and hardened by heat treatment, and are made of a carburizing clean steel with the oxygen content being adjusted to in the range of 4–7 ppm.

8. A device according to claim 1 further comprising:
a sealing means mounted on one of said inner race and said outer race for preventing at least one of an entrance of dust and a leakage of grease from around said rolling members.

9. A device according to claim 8, in which said sealing means is one of a metal seal member and a rubber seal member made of an EPDM material.

10. A device according to claim 1 further comprising:
a holding means made of a synthetic resin for rotatably holding said plurality of rolling members between said inner race and said outer race.

11. A device according to claim 3 further comprising:
a sealing means mounted on one of said inner race and said outer race for preventing at least one of an entrance of dust and a leakage of grease from around said rolling members.

12. A device according to claim 11, in which said sealing means is one of a metal seal member and a rubber seal member made of an EPDM material.

13. A device according to claim 12 further comprising:
a holding means made of a synthetic resin for rotatably holding said plurality of rolling members between said inner race and said outer race.

* * * * *